(12) United States Patent
Matsuda

(10) Patent No.: US 8,880,266 B2
(45) Date of Patent: Nov. 4, 2014

(54) ACCELERATION CONTROL SYSTEM IN ELECTRIC VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/976,979

(22) PCT Filed: Dec. 28, 2010

(86) PCT No.: PCT/JP2010/007610
§ 371 (c)(1),
(2), (4) Date: Jun. 27, 2013

(87) PCT Pub. No.: WO2012/090251
PCT Pub. Date: Jul. 5, 2012

(65) Prior Publication Data
US 2013/0274983 A1    Oct. 17, 2013

(51) Int. Cl.
*B60L 15/20* (2006.01)
*B62M 6/90* (2010.01)
*B60L 11/18* (2006.01)
*B60L 7/26* (2006.01)
*B62M 7/00* (2010.01)
*B62M 7/02* (2006.01)
*B62K 11/04* (2006.01)
*B62K 23/04* (2006.01)
*B60L 7/14* (2006.01)

(52) U.S. Cl.
CPC *B60L 15/20* (2013.01); *B62M 6/90* (2013.01); *Y02T 10/642* (2013.01); *B60L 11/1877* (2013.01); *B60L 2200/12* (2013.01); *B60L 7/26* (2013.01); *B62K 2204/00* (2013.01); *B60L 2240/423* (2013.01); *B62M 7/00* (2013.01); *B62M 7/02* (2013.01); *B60L 2250/24* (2013.01); *B60L 2240/12* (2013.01); *B60L 15/2009* (2013.01); *B62K 11/04* (2013.01); *B60L 11/1803* (2013.01); *B62K 23/04* (2013.01); *B60L 7/14* (2013.01)
USPC .......................................................... 701/22

(58) Field of Classification Search
CPC ....................................................... B60L 15/20
USPC .......................................................... 701/22
See application file for complete search history.

(56) References Cited

U.S. PATENT DOCUMENTS 4,591,017 A * 5/1986 Enjo et al. ................... 180/205.3
6,152,251 A * 11/2000 Nagai et al. ................... 180/220
(Continued)

FOREIGN PATENT DOCUMENTS

| JP | 2008229242 A | 10/2008 |
| JP | 2009013833 A | 1/2009 |
| JP | 2010254014 A | 11/2010 |

OTHER PUBLICATIONS

Japanese Patent Office, International Search Report of PCT/JP2010/007610, WIPO, Apr. 12, 2011, 2 pages.

*Primary Examiner* — Thomas Tarcza
*Assistant Examiner* — Alex C Dunn
(74) *Attorney, Agent, or Firm* — Alleman Hall McCoy Russell & Tuttle LLP

(57) ABSTRACT

A control system includes an electric motor, an electric storage device, a throttle grip, a brake lever, a controller, and an acceleration/deceleration adjustment lever. The controller supplies electric power from the electric storage device to the electric motor in response to an acceleration command input by the throttle grip and causes the electric motor to drive the rear wheel. The controller adjusts the electric power generated by rotational power applied by the rear wheel in response to an acceleration/deceleration command from the acceleration/deceleration adjustment lever. The acceleration/deceleration adjustment lever is provided separately from throttle grip.

15 Claims, 12 Drawing Sheets

(56) References Cited

U.S. PATENT DOCUMENTS

| | | | |
|---|---|---|---|
| 6,724,165 B2* | 4/2004 | Hughes | 318/376 |
| 8,205,705 B2* | 6/2012 | Li et al. | 180/206.4 |
| 8,297,384 B2* | 10/2012 | Wanger et al. | 180/14.2 |
| 8,633,611 B2* | 1/2014 | Waida et al. | 307/9.1 |
| 8,662,228 B2* | 3/2014 | Hill et al. | 180/210 |
| 2001/0008132 A1* | 7/2001 | Ikeda | 123/400 |
| 2002/0027031 A1* | 3/2002 | Miyata | 180/219 |
| 2003/0169002 A1* | 9/2003 | Hughes | 318/376 |
| 2009/0173562 A1* | 7/2009 | Namari et al. | 180/179 |
| 2010/0003872 A1* | 1/2010 | Jessen | 440/12.5 |
| 2011/0079453 A1* | 4/2011 | Wanger et al. | 180/11 |
| 2011/0080043 A1* | 4/2011 | Waida et al. | 307/9.1 |
| 2012/0022750 A1* | 1/2012 | Matsuda | 701/51 |
| 2012/0080249 A1* | 4/2012 | Yates et al. | 180/65.31 |
| 2012/0181765 A1* | 7/2012 | Hill et al. | 280/62 |
| 2013/0000439 A1* | 1/2013 | Wanger et al. | 74/491 |
| 2013/0030649 A1* | 1/2013 | Matsuda | 701/38 |

* cited by examiner

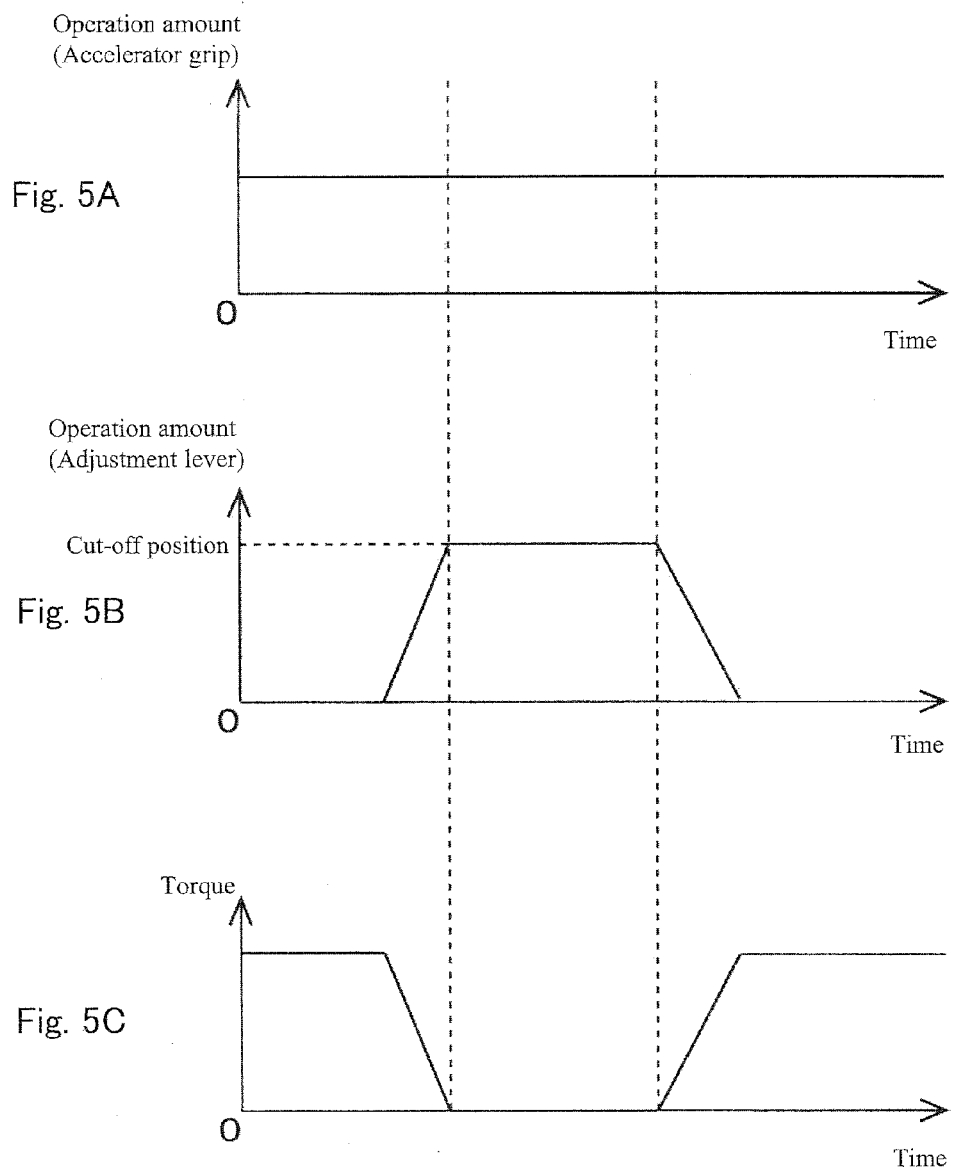

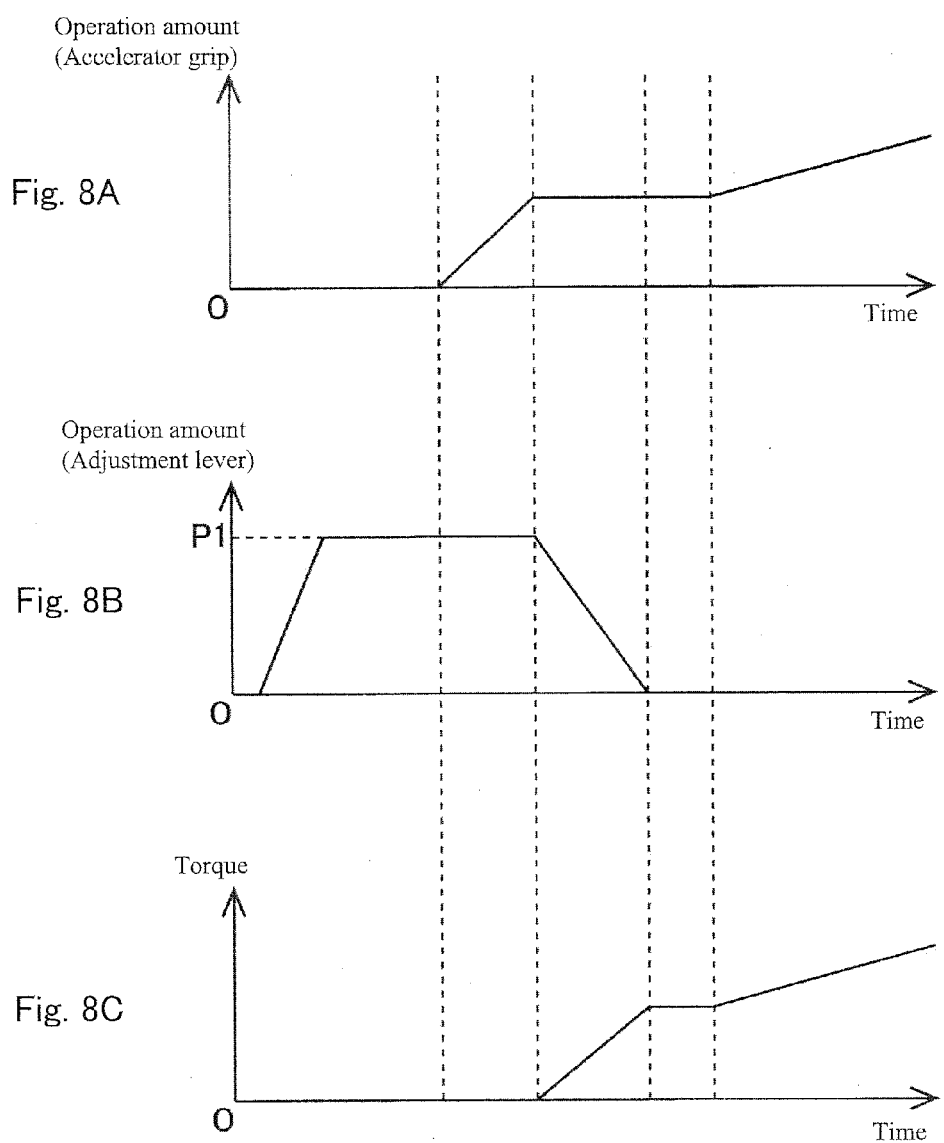

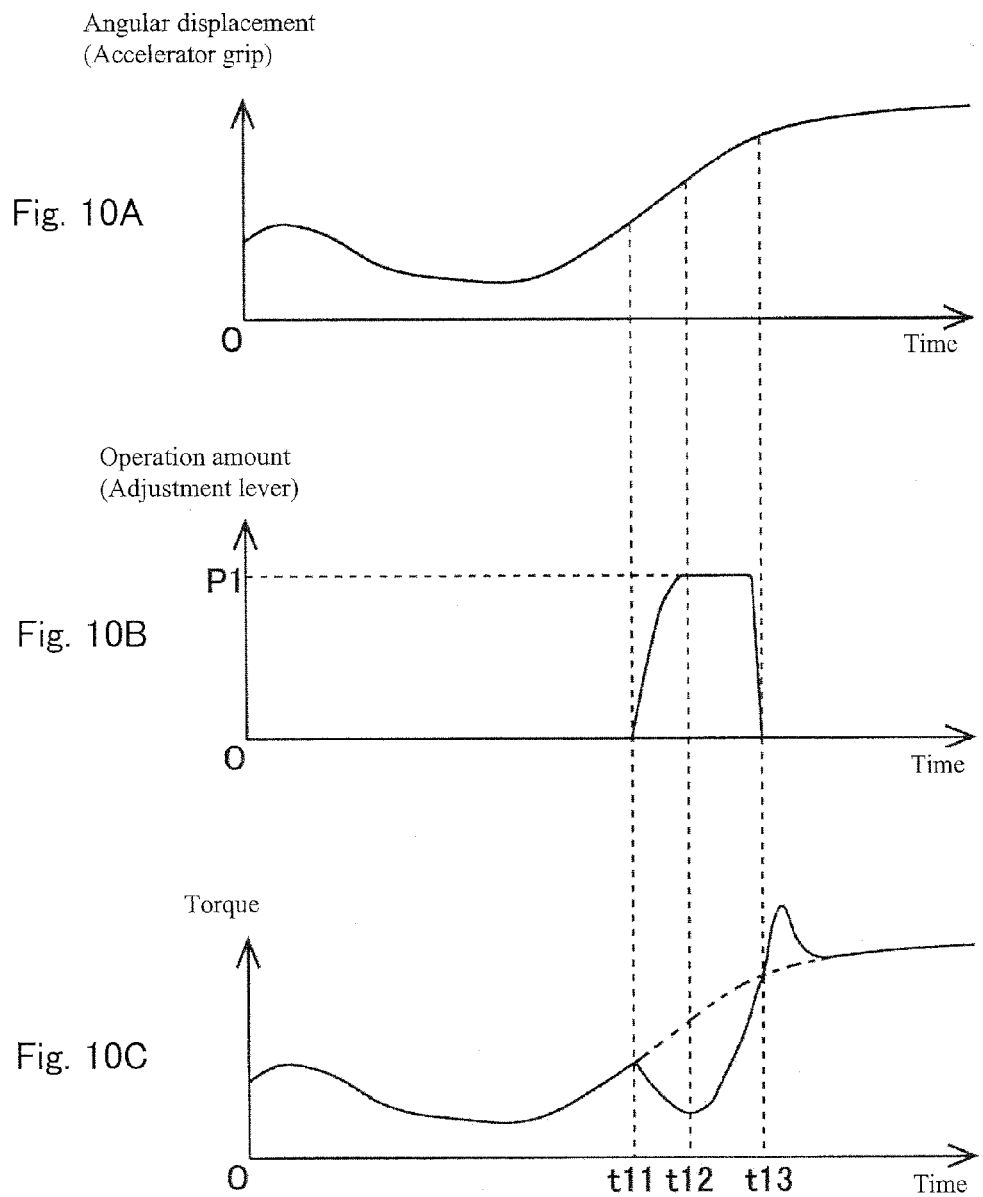

ACCELERATION CONTROL SYSTEM IN ELECTRIC VEHICLE

TECHNICAL FIELD

The present invention relates to an acceleration control system in an electric vehicle in which an electric motor is supplied with electric power corresponding to a command input by an acceleration operation member and drives a drive wheel by output torque corresponding to the electric power.

BACKGROUND ART

There is known an acceleration control system for adjusting output torque of an electric motor, in an electric vehicle which drives a drive wheel by the electric motor. In the acceleration control system, the output torque of the electric motor is adjusted in response to an operation amount of an acceleration operation member such as a throttle grip. As an example of the acceleration control system, there is a controller disclosed in Patent Literature 1.

CITATION LIST

Patent Literature

Patent Literature 1: Japanese Laid-Open Patent Application Publication No. 2008-229242.

SUMMARY OF INVENTION

Technical Problem

Patent Literature 1 discloses that a throttle grip is rotated to provide an acceleration command, and transmits the acceleration command corresponding to its angular displacement amount to a controller. However, a range in which the throttle grip can be rotated is limited to a degree to which it can be rotated by a driver's right hand, and is a relatively narrow range. Because of this, a change amount of the output torque with respect to a unit change amount of the angular displacement amount is great, and therefore it is difficult to finely adjust the change amount of the output torque.

An object of the present invention is to provide an acceleration control system in an electric vehicle which is capable of finely adjusting the output torque of the electric motor.

Solution to Problem

An acceleration control system in an electric vehicle of the present invention comprises an electric motor for driving a drive wheel by electric power supplied to the electric motor; an acceleration operation member for inputting a command for causing the drive wheel to be accelerated; a controller for supplying to the electric motor electric power corresponding to the command from the acceleration operation member; and an acceleration amount adjustment member provided separately from the acceleration operation member; wherein the controller controls an amount of the electric power supplied to the electric motor in response to the command from the acceleration adjustment member.

In accordance with the present invention, since the acceleration amount adjustment member which is different from the acceleration operation member is provided, it becomes easy to finely adjust the output torque transmitted from the electric motor to the drive wheel.

In the above invention, preferably, the controller generates the electric power supplied to the electric motor in response to an operation of the acceleration operation member, and suppresses the electric power supplied to the electric motor in response to an operation of the acceleration amount adjustment member.

In accordance with the above configuration, it becomes possible to suppress the transmitted output torque by returning the acceleration operation member to an initial state in which the acceleration operation member is not operated. Also, by operating the acceleration amount adjustment member, in the state in which the acceleration operation member has been operated, it becomes possible to suppress the transmitted output torque. Thus, the output torque can be suppressed by using either the acceleration operation member or the acceleration amount adjustment member.

In the above invention, preferably, the acceleration operation member may be movable in a first predetermined direction from a predetermined first reference position and is applied with a biasing force in a direction opposite to the first predetermined direction to return the acceleration operation member to the first reference position; the acceleration amount adjustment member may be movable in a second predetermined direction from a predetermined second reference position and is applied with a biasing force in a direction opposite to the second predetermined direction to return the acceleration amount adjustment member to the second reference position; and the controller may increase the electric power supplied to the electric motor as an operation amount of the acceleration operation member with respect to the first reference position increases and decreases the electric power supplied to the electric motor as the acceleration operation member moves closer to the first reference position when the acceleration operation member returns to the first reference position; and the controller may decrease the electric power supplied to the electric motor as an operation amount of the acceleration amount adjustment member with respect to the second reference position increases and increases the electric power supplied to the electric motor as the acceleration amount adjustment member moves closer to the second reference position when the acceleration amount adjustment member returns to the second reference position.

In accordance with the above configuration, when the acceleration operation member is moved in the first predetermined direction, the drive wheel is accelerated, while when the acceleration operation member is returned to the first reference position, acceleration of the drive wheel stops. When the acceleration amount adjustment member is moved in the second predetermined direction, a degree of the acceleration of the drive wheel is mitigated, while when the acceleration operation member is returned toward the second reference position, the degree of the acceleration of the drive wheel is increased. By moving the acceleration amount adjustment member different from the acceleration operation member in the second predetermined direction or returning it to the second reference direction as described above, an acceleration amount can be adjusted, which improves flexibility of the operation.

In the above invention, preferably, the controller nullifies the operation of the acceleration operation member and halts electric power supply to the electric motor, when the acceleration amount adjustment member is moved by a predetermined operation amount or greater in the second predetermined direction from the second reference position.

In accordance with the above configuration, by operating the acceleration amount adjustment member, it becomes possible to prevent the drive wheel from moving, even when the acceleration operation member is operated by the driver or a third party.

In the above invention, preferably, the electric vehicle comprises a steering device including two gripping members which are gripped by driver's right and left hands, respectively; the acceleration operation member is provided at one of the gripping members; and the acceleration amount adjustment member is provided at the other gripping member.

In accordance with the above configuration, the acceleration operation member and the acceleration amount adjustment member can be operated with different hands, respectively. Thus, the acceleration amount can be adjusted with right and left hands.

In the above invention, preferably, the acceleration operation member is an operation member of a throttle grip shape which is attached on the one of the gripping members such that the acceleration operation member is operated to be rotatable in the first predetermined direction around an axis of the acceleration operation member; and the acceleration amount adjustment member is an operation member of a lever shape which is operated to be movable in the second predetermined direction.

In the above invention, preferably, the controller may supply to the electric motor prescribed electric power corresponding to the operation amount of the acceleration operation member; when the acceleration amount adjustment member is moved by the predetermined operation amount or more and the acceleration operation member is operated, before starting of the electric vehicle, and then the acceleration amount adjustment member is returned by a predetermined operation amount or more to activate the electric motor to start the electric motorcycle, the controller gradually increases the electric power supplied to the electric motor to the prescribed electric power.

In accordance with the above configuration, it becomes possible to prevent a situation in which driving power increases rapidly in response to the operation amount of the acceleration operation member and hence the electric vehicle starts abruptly, during starting.

In accordance with the above configuration, since the acceleration operation member is the operation member of the throttle grip shape which is operated to be rotatable, its rotational angle can be easily kept at a constant value, and hence the operation amount is kept easily. By comparison, since the acceleration amount adjustment member is the operation member of the lever shape, it can be moved to a great degree in a short time, and the electric vehicle can be decelerated quickly by the acceleration amount adjustment member.

In the above invention, preferably, when a predetermined torque increasing condition is satisfied after the acceleration amount adjustment member has been moved in the second predetermined direction, the controller supplies to the electric motor instantaneous electric power which is greater than prescribed electric power corresponding to an operation amount of the acceleration operation member at a time point when the predetermined torque increasing condition is satisfied.

In accordance with the above configuration, the output torque can be increased rapidly after the output torque is decreased by the operation of the acceleration amount adjustment member.

Advantageous Effects of Invention

In accordance with the above configuration, the output torque of the electric motor can be finely adjusted.

BRIEF DESCRIPTION OF DRAWINGS

FIG. 5A-C are graphs showing an example of a change in an operation amount of an accelerator grip, a change in an operation amount of an adjustment lever, and a change in torque, which changes occur with time, when a torque adjustment process is executed.

FIG. 8A-B are graphs showing an example of a change in the operation amount of the accelerator grip, a change in the operation amount of the adjustment lever, and a change in the torque, which changes occur with time, in the electric motorcycle of FIG. 1.

FIG. 10A-B are graphs showing a change in the accelerator grip, a change in the torque, and a change in the adjustment lever, which changes occur with time, in the electric motorcycle of FIG. 1.

DESCRIPTION OF EMBODIMENTS

Figure 1:
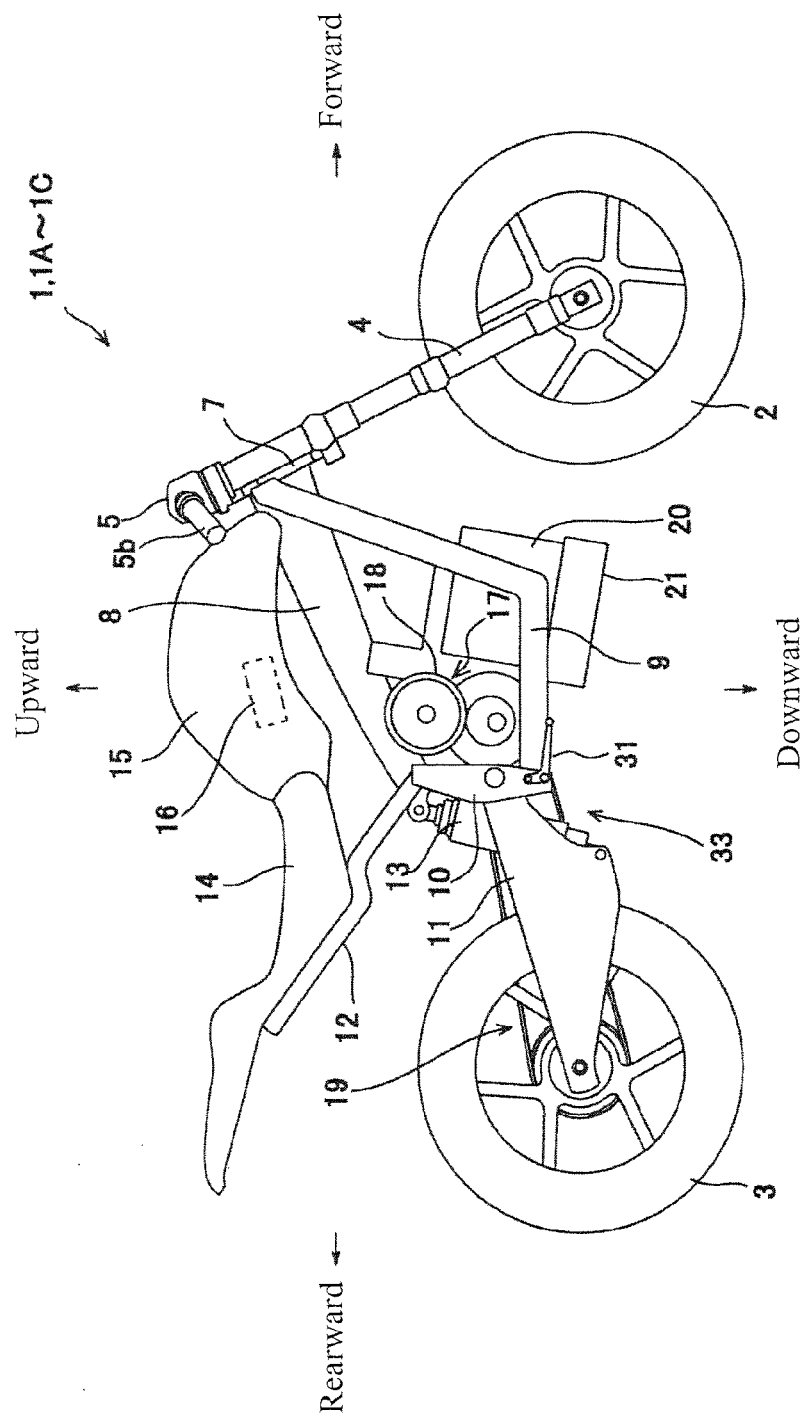
FIG. 1 is a right side view of an electric motorcycle as an example of an electric vehicle including one of control systems according to Embodiment 1 to Embodiment 4 of the present invention.

Hereinafter, embodiments of the present invention will be described with reference to the drawings. Hereinafter, electric motorcycles 1, 1A to 1C will be described as the embodiments of an electric vehicle of the present invention. The stated directions are from the perspective of the driver which straddles the electric motorcycles 1, 1A to 1C. Throughout the drawings, the same or corresponding components are identified by the same reference numerals, and repetitive description of them will not be given. The present invention is not limited to the embodiments and addition, deletion, and change can be made without departing a spirit of the invention.

Embodiment 1

As shown in FIG. 1, an electric motorcycle 1 includes a front wheel 2 and a rear wheel 3. The front wheel 2 is rotatably mounted to a lower end portion of a front fork 4. The front fork 4 is coupled to a bar-type handle 5 via a steering shaft (not shown). The steering shaft is rotatably supported by a head pipe 7. A main frame 8 is mounted to the head pipe 7. The main frame 8 extends rearward and downward from the head pipe 7 and is positioned to extend along a center line in a vehicle width direction when viewed from above. The head pipe 7 is provided with a pair of down frames 9. The pair of down frames 9 extend downward while protruding outward in the vehicle width direction, from the head pipe 7, are bent, and then extend rearward.

A pivot frame 10 is provided at a rear lower end portion of the main frame 8 and rear end portions of the pair of down frames 9. The rear lower end portion is coupled to the rear end portion via the pivot frame 10. The pivot frame 10 is provided with a swing arm 11. A front end portion of the swing arm 11 is coupled to the pivot frame 10 such that the swing arm 11 is pivotable around the front end portion. The rear wheel 3 is rotatably mounted to a rear end portion of the swing arm 11. A rear wheel suspension 13 is mounted to the front end portion of the swing arm 11. The rear wheel suspension 13 is coupled to the rear end portion of the main frame 8. The rear wheel suspension 13 is mounted to and between the swing arm 11 and the main frame 8. A seat rail 12 is provided at the rear end portion of the main frame 8. The seat rail 12 extends rearward and upward from a rear portion of the main frame 8. A driver straddle seat 14 is mounted over the seat rail 12. In front of the seat 14, a dummy tank 15 is disposed. The dummy tank 15 is positioned between the seat 14 and the handle 5.

Figure 2:
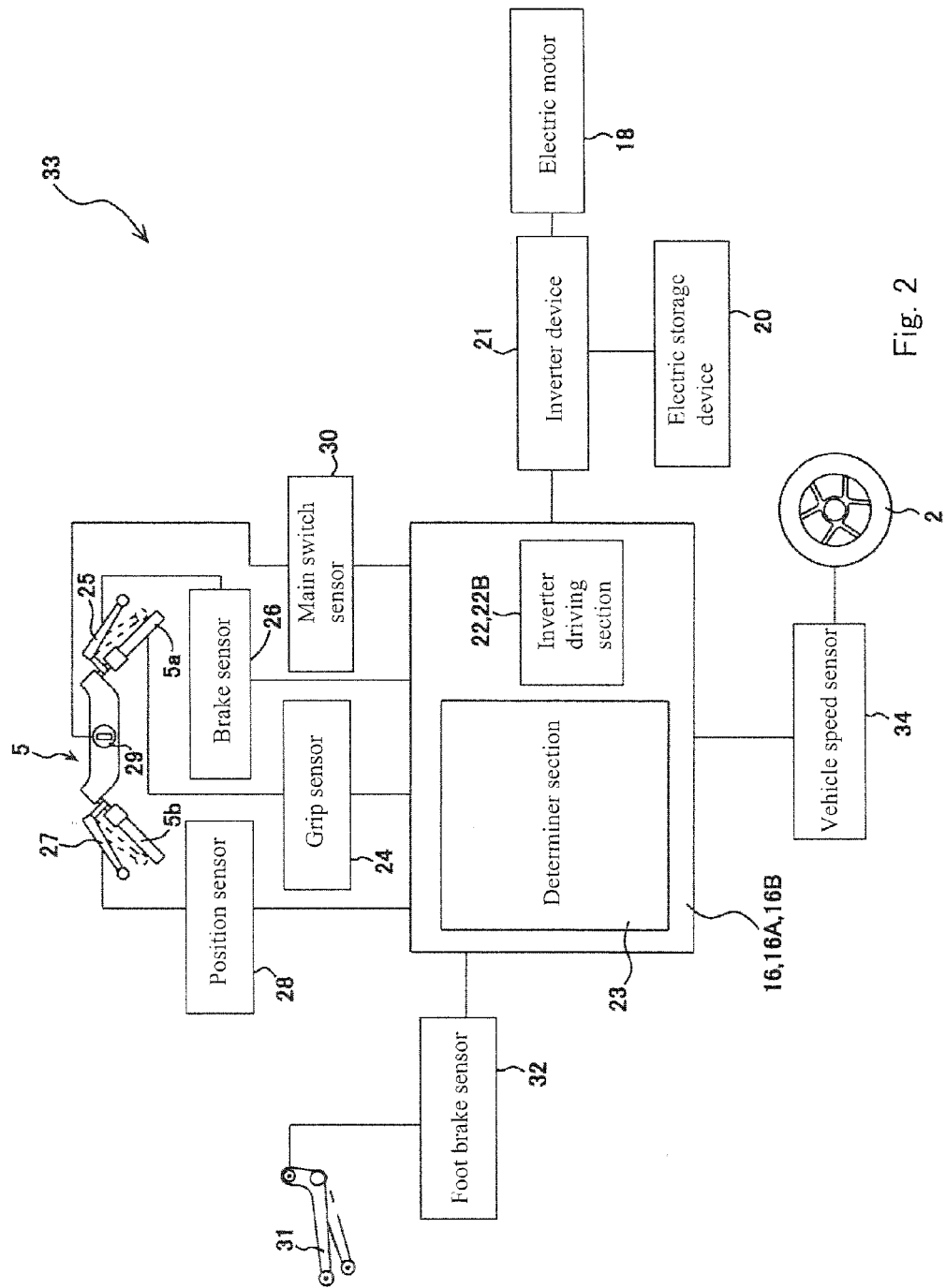
FIG. 2 is a block diagram showing an electric configuration of the control system in each of electric motorcycles according to Embodiment 1 to Embodiment 3 of the present invention.

A controller 16 is accommodated into the dummy tank 15. An electric motor case 17 is provided under the dummy tank 15. The electric motor case 17 is mounted to the main frame 8 and the pair of down frames 9. An electric motor 18 is accommodated into the electric motor case 17. The electric motor 18 is, so-called three-phase AC motor, and is coupled to the rear wheel 3 which is a drive wheel, via a power transmission mechanism 19. The power transmission mechanism 19 includes, for example, a chain, a belt, or a drive shaft. The power transmission mechanism 19 is configured to transmit output torque of the electric motor 18 to the rear wheel 3 which is the drive wheel, and transmit a rotational power of the rear wheel 3 to the electric motor 18. The electric motor 18 generates electric power by the rotational power transmitted from the rear wheel 3. As shown in FIG. 2, the electric motor 18 thus configured is coupled to an electric storage device 20 via an inverter device 21.

The electric storage device 20 and the inverter device 21 are positioned between bent portions of the pair of down frames 9. The electric storage device 20 is able to charge and discharge DC power. The inverter device 21 has an inverter function which converts the DC power discharged from the electric storage device 20 into three-phase AC power and supplies the three-phase AC power to the electric motor 18, and a converter function which converts the AC power generated in the electric motor 18 into the DC power and stores the DC power in the electric storage device 20. The inverter device 21 is coupled to the controller 16.

The controller 16 has an inverter driving section 22. The inverter driving section 22 controls driving of the inverter device 21, to be specific, performs PWM control such that the AC power supplied to the electric motor 18 is adjusted by adjusting a frequency and voltage of the AC power supplied to the electric motor 18 and the electric power generated in the electric motor 18 is generated by changing a duty ratio. For example, the duty ratio is adjusted and the generated electric power is changed by changing a switching cycle and a timing of a switching element of the inverter device 21 based on a vehicle speed.

The controller 16 includes a determiner section 23. The determiner section 23 receives commands input by operation members attached on the electric motorcycle 1 via sensors, and determines whether or not conditions are satisfied based on the received commands. The controller 16 and these operation members construct a control system 33. Hereinafter, the operation members attached on the electric motorcycle 1 will be described with reference to FIGS. 2 and 3.

Figure 3:
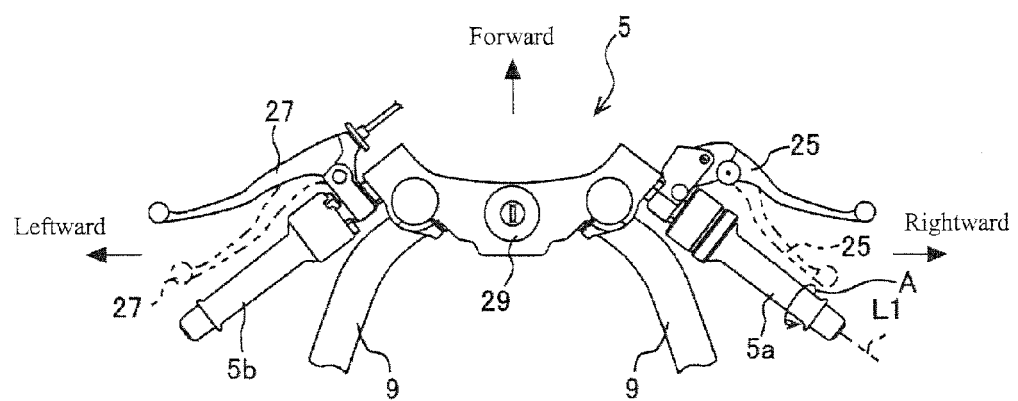
FIG. 3 is an enlarged plan view showing a region near a handle of the electric motorcycle according to Embodiment 1 of the present embodiment.

As shown in FIG. 3, a handle 5 which is a steering device has a pair of right and left grips 5a and 5b. As shown in FIG. 2, the pair of grips 5a and 5b which are gripping members are provided at a right end portion and a left end portion of the handle 5, respectively. The right grip 5a is an accelerator grip by which an acceleration command (to be specific, torque command) for acceleratively rotating the rear wheel 3 is input. The accelerator grip 5a which is an acceleration operation member is rotatable around an axis L1 along which the handle 5 extends, and is positioned in a grip reference position (first reference position) in a non-operated state. The accelerator grip 5a is applied with a biasing force for biasing the accelerator grip 5a in a predetermined direction (i.e., direction away from the driver, a direction opposite to a direction indicated by an arrow A, i.e., forward) toward the grip preference position. The accelerator grip 5a is rotatable in a direction (i.e., direction toward the driver, the direction indicated by the arrow A, rearward) opposite to the predetermined direction against the biasing force.

The accelerator grip 5a is provided with an accelerator grip sensor 24. The accelerator grip sensor 24 outputs an acceleration command corresponding to an angular displacement amount (hereinafter simply referred to as "operation amount.") θ from the grip reference position. To be specific, the acceleration command increases output torque T with an increase in the angular displacement position. The accelerator grip sensor 24 is coupled to the controller 16 and provides the acceleration command to the controller 16. The inverter driving section 22 in the controller 16 controls driving of the inverter device 21 in response to the acceleration command to adjust the electric power supplied to the electric motor 18. To be more specific, the controller 16 increases the output torque of the electric motor 18 in response to the rotation of the accelerator grip 5a from the grip reference position toward the driver and decreases the output torque of the electric motor 18 in response to returning of the accelerator grip 5a to the grip reference position.

A brake lever 25 is provided in front of the accelerator grip 5a. The brake lever 25 can be gripped together with the right grip 5a in a state in which the brake lever 25 is grabbed with fingers of the driver's right hand. By pulling the brake lever 25 toward the driver with the fingers of the driver's right hand grabbing the brake lever 25, the brake lever 25 is pivotable toward the driver (two-dotted line in FIG. 3) from the brake lever reference position (see solid line in FIG. 3). The brake lever 25 is applied with a biasing force for returning the brake lever 25 to the brake lever reference position. When the driver takes off with the brake lever 25 in a state in which the brake lever 25 is pulled toward the driver, the brake lever 25 returns to the brake lever reference position.

The brake lever 25 is an operation member for activating a front wheel brake mechanism (not shown) provided for the front wheel 2. By pulling the brake lever 25 toward the driver, the front wheel brake mechanism is activated, to apply a mechanical brake force to the front wheel 2. By adjusting a displacement amount of the brake lever 25, the braking force applied to the front wheel 2 can be adjusted. The brake lever 25 having such a function is provided with a brake sensor 26. The brake sensor 26 is a switching sensor and is configured to detect whether or not the brake lever 25 has been operated. The brake sensor 26 is coupled to the controller 16 and provides a result of detection to the controller 16.

By comparison, an adjustment lever 27 is provided in front of the left grip 5b. The adjustment lever 27 can be gripped together with the left grip 5b in a state in which the adjustment lever 27 is grabbed with fingers of the driver's left hand. By pulling the adjustment lever 27 toward the driver with the fingers of the driver's left hand grabbing the adjustment lever 27, the adjustment lever 27 is pivotable toward the driver (two-dotted line in FIG. 3) from an adjustment lever reference position (see solid line in FIG. 3). The adjustment lever 27 is applied with a biasing force for returning the adjustment lever 27 to the adjustment lever reference position. When the driver takes off the adjustment lever 27 in a state in which the adjustment lever 27 is pulled toward the driver, the adjustment lever 27 returns to the adjustment lever reference position. In the present embodiment, the adjustment lever 27 serves as an adjustment member by which the driver inputs an adjustment command to adjust the output torque of the electric motor 18 and the electric power generated in the electric motor 18 as will be described later.

The adjustment lever 27 is provided with a position sensor 28. The position sensor 28 outputs an adjustment command corresponding to a position (operation amount) with respect to the adjustment lever reference position. The position sensor 28 is coupled to the controller 16, and inputs the adjustment command to the controller 16. The controller 16 executes a torque adjustment process and a regenerative braking force adjustment process as will be described later, in response to the input adjustment command, to adjust the output torque and the regenerative braking force of the electric motor 18.

The handle 5 is further provided with a main switch 29. The main switch 29 is, for example, a push button switch and is a switch used to input a command which causes electric power supply to the electronic components in the electric motorcycle 1 to be started or finished. The main switch 29 is not limited to the push button switch, and may be a rotary switch such as a key cylinder configured such that a key is inserted and rotated, or a switch which is able to provide a starting command by holding over an IC card, a portable terminal which enables radio communication, etc. The main switch 29 is provided with a main switch sensor 30. The main switch sensor 30 is able to detect whether or not the main switch 29 has been operated. The main switch 29 is coupled to the controller 16 and provides a result of detection to the controller 16.

As shown in FIG. 2, the electric motorcycle 1 includes a foot brake lever 31. The foot brake lever 31 is provided at a right side of a lower end portion of the pivot frame 10. The foot brake lever 31 allows a pastern of a right foot to be put thereon, and a toe of the right foot to be put on its tip end portion. The foot brake lever 31 is pivotable downward from a foot brake reference position (position in FIG. 1) by depressing the tip end portion of the brake lever 31 with the toe. The foot brake lever 31 is applied with a biasing force for returning the depressed foot brake lever 31 to the foot brake reference position.

The foot brake lever 31 is an operation member for activating a rear wheel brake mechanism (not shown) provided for the rear wheel 3. By depressing the tip end portion of the foot brake lever 31, the rear wheel brake mechanism is activated to apply a mechanical braking force to the rear wheel 3. By adjusting a displacement amount of the foot brake lever 31, the braking force applied to the rear wheel 3 can be adjusted. The foot brake lever 31 having such a function is provided with a foot brake sensor 32. The foot brake sensor 32 is a switching sensor and detects whether or not the foot brake lever 31 has been operated. The foot brake sensor 32 is coupled to the controller 16 and provides a result of detection to the controller 16.

The operation members and sensors arranged in locations construct the control system 33 together with the controller 16, the electric motor 18, the electric storage device 20 and the inverter device 21. In addition to the above stated sensors, the control system 33 includes a vehicle speed sensor 34 for detecting a speed of the electric motorcycle 1. The vehicle speed sensor 34 provides a signal corresponding to the detected speed to the controller 16.

Figure 4:
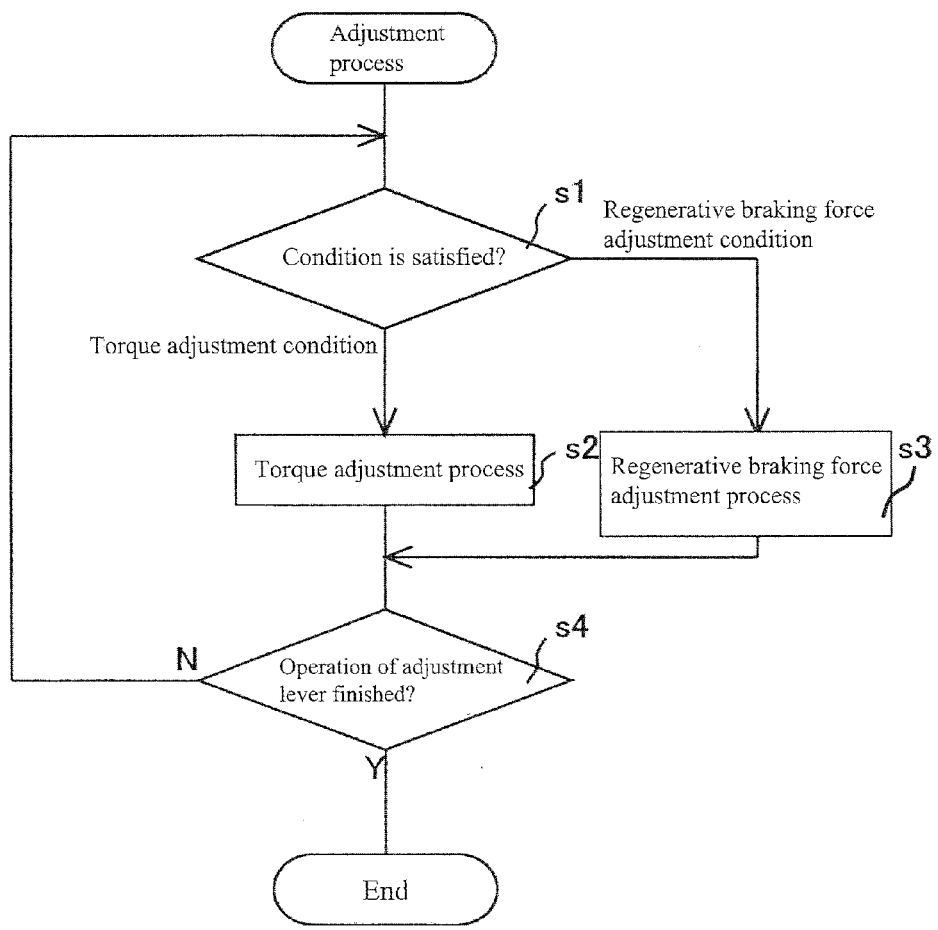
FIG. 4 is a flowchart showing a procedure of an electric motor control process in the electric motorcycle of FIG. 1.

The controller 16 thus configured is configured to adjust the output torque and the regenerative braking force of the electric motor 18, as described above. Hereinafter, an operation (adjustment process) of the controller 16 in a case where the adjustment command is input by operating the adjustment lever will be described with reference to the flowchart of FIG. 4. Receiving the adjustment command from the position sensor 28, the controller 16 initiates the adjustment process, and the process goes to step s1. In step s1 which is a torque adjustment condition determination step, the controller 16 determines whether or not a predetermined torque adjustment condition or a predetermined regenerative braking force adjustment condition is satisfied. The torque adjustment condition is such that the accelerator grip 5a has been angularly displaced from the grip reference position, i.e., the accelerator grip 5a has been operated. The regenerative braking force adjustment condition is, for example, such that the accelerator grip 5a has been returned with an operation amount within a predetermined range (e.g., not less than 0 degrees and not greater than 5 degrees) from the grip reference position, i.e., the accelerator grip 5a is not operated. The regenerative braking force adjustment condition may be such that a revolution of the electric motor 18 is equal to or less than a predetermined value, a driving speed is equal to or lower than a predetermined speed, or the brake operation member has been operated.

In step s1, if it is determined that the torque adjustment condition has been satisfied based on the information from the accelerator grip sensor 24, the process goes to step s2. In step s2, the controller 16 adjusts the output torque adjustment (i.e., torque adjustment process) of the electric motor 18 in response to the adjustment command. If it is determined that the regenerative braking force adjustment condition is satisfied based on the output of the accelerator grip sensor 24, the process goes to step s3. In step s3, the controller 16 adjusts the electric power (regenerative braking force) generated in the electric motor 18 (regenerative braking force adjustment process) in response to the adjustment command.

Receiving the adjustment command, the controller 16 determines which of the torque adjustment condition and the regenerative braking force adjustment condition is satisfied based on the output from the accelerator grip sensor 24, and performs different processing based a result of the determination. When the processing finishes, the process goes to step s4, and the controller 16 detects whether or not the operation of the adjustment lever 27 has finished (i.e., the adjustment lever 27 has been returned to the adjustment lever reference position) based on the adjustment command from the position sensor 28. If it is determined that the operation of the adjustment lever 27 has not finished, the process returns to step s1, whereas if it is determined that the operation of the adjustment lever 27 has finished, the controller 16 finishes the processing. Hereinafter, the torque adjustment process in step s2 and the regenerative braking force adjustment process in step s3 will be described.

Initially, the torque adjustment process performed in response to the adjustment command will be specifically described with reference to the graph in FIGS. 5A-C. FIG. 5A indicates the operation amount of the throttle grip 5a. FIG. 5B indicates the operation amount of the adjustment lever 27. FIG. 5C is a graph showing torque generated in the electric motor 18 when the operation of FIG. 5A and the operation of FIG. 5B are performed. In the graphs, horizontal axes indicate time, and vertical axes indicate the operation amount, the operation amount and the torque, respectively. In the torque adjustment process, the controller 16 provides the electric power corresponding to the acceleration command from the accelerator grip sensor 24 to the electric motor 18 to generate the torque. When the adjustment lever 27 is pulled toward the driver from the adjustment lever reference position in a state in which the accelerator grip 5a is operated, the controller 16 decreases the output torque of the electric motor 18 in response to the adjustment command.

Specifically, when the adjustment lever 27 is operated in a state in which the accelerator grip 5a is rotated toward the driver to accelerate the electric motorcycle 1, the inverter driving section 22 controls driving of the inverter device 21 to decrease the electric power supplied to the electric motor 18. The inverter driving section 22 decreases the electric power according to a position (i.e., operation amount) of the adjustment lever 27 with respect to the adjustment lever reference position, and is able to decrease the electric power steplessly from 0% (adjustment lever reference position) to 100% (cut-off position) in a range from the adjustment lever reference position to a cut-off position which is beyond a predetermined cut-off operation amount P1, for example. Instead of steplessly, the inverter driving section 22 may adjust the generated electric power in response to the adjustment command from the position sensor 28. When the adjustment lever 27 is moved to the cut-off position, the controller 16 electrically disconnects the electric motor 18 and the electric storage device 20 via the inverter device 21, and halts the electric power supply to the electric motor 18 and the power generation in the electric motor 18. In this state, when the accelerator grip 5a is returned to the grip reference position, the controller 16 increases the output torque of the electric motor 18 with a ratio corresponding to the adjustment command again.

In the electric motorcycle 1 configured as described above, fine adjustment of the output torque, which is difficult to realize by operating only the accelerator grip 5a, can be performed easily by using the adjustment lever 27. By moving the accelerator grip 5a toward the driver, the output torque can be increased, while by returning the accelerator grip 5a to the non-operated state, the output torque can be lessened. By comparison, by moving the adjustment lever 27 toward the cut-off position, the output torque can be lessened, while by returning the adjustment lever 27 to the adjustment lever reference position, the output torque can be restored. In this way, the output torque can be lessened, by operating any of the two operation members 5a and 27. Since the two operation members 5a and 27 are moved in opposite directions to increase and decrease the output torque, the operation becomes more flexible. In addition, by moving the adjustment lever 27 to the cut-off position, the operation of the accelerator grip 5a is nullified and the electric power supply to the electric motor 18 is halted.

Since the accelerator grip 5a is rotated to increase or decrease the output torque, its operation amount (rotational angle) can be easily kept constant, which makes it easier to drive the electric motorcycle 1 at a constant speed. By comparison, since the adjustment lever 27 is pulled or taken off to decrease or increase the output torque, it can be operated to a great degree in a short time and the output torque can be changed quickly to a great degree. This makes it possible to perform the operation for changing the output torque according to a situation.

In the present embodiment, the adjustment lever 27 is an operation member for decreasing the output torque generated according to the operation amount of the accelerator grip 5a, and the controller 16 causes the adjustment lever 27 to prevent torque which is equal to or greater than the output torque corresponding to the operation amount of the accelerator grip 5a from being generated. When the controller 16 detects that the adjustment lever 27 is in the cut-off position, based on the adjustment command from the position sensor 28, the electric motor 18 and the electric storage device 20 are disconnected in response to the adjustment command with a priority, irrespective of the operation amount of the accelerator grip 5a.

Although in the present embodiment, the controller 16 adjusts the electric power supply to the electric motor 18 such that a rate of the output torque of the electric motor 18 is decreased in response to the adjustment command from the position sensor 28, it may adjust the electric power supply to cause the electric motor 18 to generate torque having a torque value ($T_{TH}-T_R$) which is derived by subtracting a torque value $T_R$ corresponding to the adjustment command from a torque value $T_{TH}$ generated in response to the acceleration command from the accelerator grip sensor 24.

The rate of the output torque decreasing per unit operation amount of the lever, or an amount of the subtraction may be changed, based on driving states such as the revolutions of the electric motor 18, a driving speed, and a reduction gear ratio (in a case where the power transmission mechanism 19 includes a transmission). For example, a magnitude of the output torque decreasing per unit operation amount of the adjustment lever 27 may be increased or reduced in each of a high-speed range, a medium-speed range, and a low-speed range. Or, the output torque to be decreased may be changed in response to a change in the operation amount which occurs with time. Or, a delay characteristic may be provided to prevent the output torque from rapidly decreasing or rapidly increasing in response to a rapid operation of the adjustment lever 27. By adjusting the change in the output torque in response to the adjustment command, the torque can be adjusted according to the driver's preference.

Figure 6A:
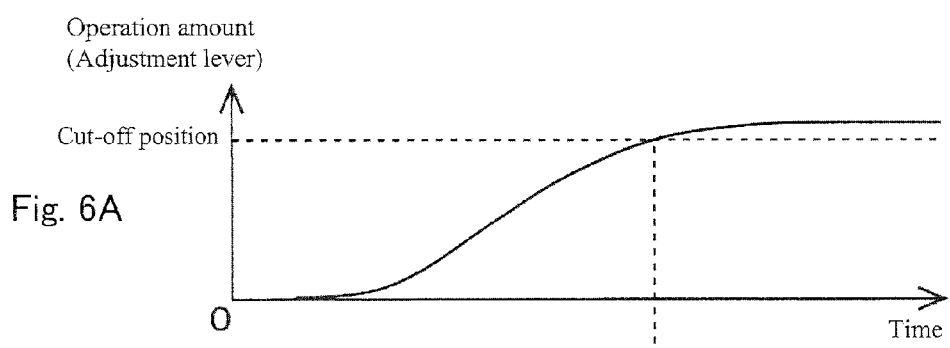
FIGS. 6A and 6B are graphs showing an example of a change in the operation amount of the accelerator grip, a change in the operation amount of the adjustment lever, and a change in the torque, which changes occur with time, when a regenerative braking force adjustment process is executed.
Figure 6B:
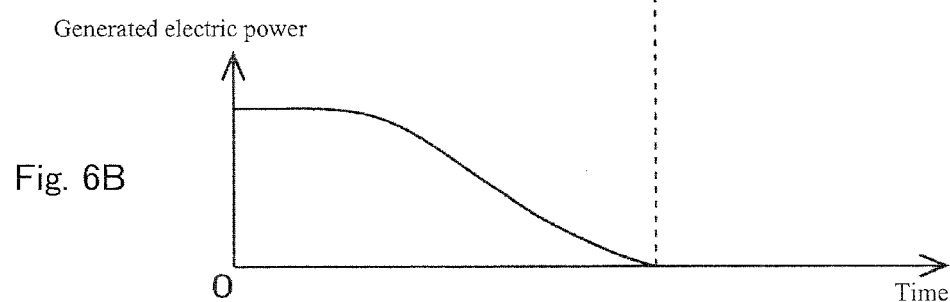

Next, the regenerative braking force adjustment process performed in response to the adjustment command will be specifically described with reference to the graphs of FIGS. 6A and 6B. FIG. 6A indicates the operation amount of the adjustment lever 27. FIG. 6B is a graph indicating the electric power generated in the electric motor 18 in response to the operation shown in FIG. 6A. In the graphs, horizontal axes indicate time, while vertical axes indicate the operation amount and the generated electric power.

In the regenerative braking force adjustment process, a rotational power of the rear wheel 3 rotating is transmitted to the electric motor 18 via the power transmission mechanism 19. In this case, the inverter device 21 is activated to cause the electric motor 18 to generate electric power. The generated electric power is stored in the electric storage device 20 via the inverter device 21 and regenerated. During such regeneration, the power generation in the electric motor 18 becomes a rotation resistance to the rear wheel 3, and a braking force is applied to the rear wheel 3. Hereinafter, this braking force will be referred to as a regenerative braking force to be differentiated from a mechanical braking force generated in a brake mechanism.

The controller 16 adjusts the electric power generated in the electric motor 18 according to the operation amount of the adjustment lever 27, i.e., in response to the adjustment command from the position sensor 28, during the regeneration. The controller 16 decreases the electric power generated in the electric motor 18 by pulling the adjustment lever 27 toward the driver from the adjustment lever reference position, and increases the electric power generated in the electric motor 18 by returning the adjustment lever 27 to the adjustment lever reference position.

Specifically, when the adjustment lever 27 is operated during a regenerative state in which the regenerative braking force is applied to the rear wheel 3 (i.e., during regeneration) (see FIG. 6A), the inverter driving section 22 controls driving of the inverter device 21 to decrease the electric power generated in the electric motor 18 (see FIG. 6B). In this case, the inverter driving section 22 adjusts the electric power generated in the electric motor 18 according to the position of the adjustment lever 27 with respect to the adjustment lever reference position, i.e., in response to the acceleration/deceleration command from the position sensor 28. For example, the inverter driving section 22 controls driving of the inverter device 21 steplessly such that the electric power is adjusted from 100% (adjustment lever reference position) to 0% (cut-off position), for example, in a range from the adjustment lever reference position to the cut-off position. Instead of steplessly, the inverter driving section 22 may adjust the generated electric power stepwisely in response to the adjustment command from the position sensor 28.

As described above, in the electric motorcycle 1, the mechanical braking force generated by the rear wheel brake mechanism and the regenerative braking force applied to the rear wheel 3 can be independently adjusted with right and left hands, respectively, and the driver can adjust the braking force to be used and its magnitude according to the situation. Since the accelerator grip 5a and the adjustment lever 27 are provided separately, the accelerative force and the regenerative braking force can be adjusted independently, and the driver can adjust the accelerative force and the regenerative braking force according to the situation.

Since the adjustment lever 27 is provided in the vicinity of the left grip 5b, the driver can easily operate the adjustment lever 27 to input the command in the middle of driving. Since the adjustment lever 27 serves as an electric cut-off switch between the electric motor 18 and the electric storage device, another switch need not be provided, which can reduce the number of components. By placing the adjustment lever 27 in the cut-off position, it becomes possible to attain the cut-off state in which the output torque of the electric motor 18 and the electric power generated in the electric motor 18 become zero. Therefore, in the state in which the adjustment lever 27 is placed in the cut-off position, it is possible to prevent the torque or the regenerative braking force from being generated even when the accelerator grip 5a is returned to the non-operated state and then is operated. This can relieve a shock which would otherwise be generated when switching between the torque adjustment state and the regenerative braking force adjustment state occurs.

Since the magnitude of the regenerative braking force can be adjusted according to the operation amount of the adjustment lever 27, the regenerative braking force can be adjusted according to the driving state or the driver's feeling, as in the brake lever 25. In addition, the regenerative braking force can be adjusted easily by moving the adjustment lever 27 in a forward and rearward direction.

The generated electric power decreasing per unit operation amount of the lever can be changed based on driving states such as the revolutions of the electric motor 18, the driving speed, and the reduction gear ratio. This makes it possible to adjust a regeneration amount according to the driver's preference. In the present embodiment, a rate with which the generated electric power is decreased by operating the adjustment lever 27 may be changed based on driving states such as the revolutions of the electric motor 18, the driving speed, and the reduction gear ratio (in a case where the power transmission mechanism 19 includes the transmission). For example, in a high-speed range, the rate with which the generated electric power is decreased when the adjustment lever 27 is placed in the adjustment lever reference position may be set about 30% to prevent a regenerative braking force of a great magnitude from being generated in the high-speed range. On the other hand, in a low-speed range, the generated electric power may be generated with a rate of about 100% when the adjustment lever 27 is placed in the adjustment lever reference position to generate a regenerative braking force of a great magnitude in the low-speed range.

The rate with which the generated electric power is decreased in response to the operation amount of the adjustment lever 27 may be changed according to each speed range or each speed so that a regenerative braking force generated when the speed of the electric motorcycle 1 is decreased in a state in which the operation amount of the adjustment lever 27 is maintained. In a speed range which is equal to or lower than a predetermined speed, the rate with which the generated electric power is decreased in response to the operation amount of the adjustment lever 27, can be reduced. This makes it possible to suppress the regenerative braking force from working excessively in the speed range which is equal to or lower than the predetermined speed.

Or, a delay characteristic may be provided with respect to the operation of the adjustment lever 27 to prevent the regenerative braking force corresponding to the operation of the adjustment lever 27 from rapidly decreasing or rapidly increasing. By adjusting the change in the regenerative braking force in response to the adjustment command, the torque can be adjusted according to the driver's preference.

Figure 7:
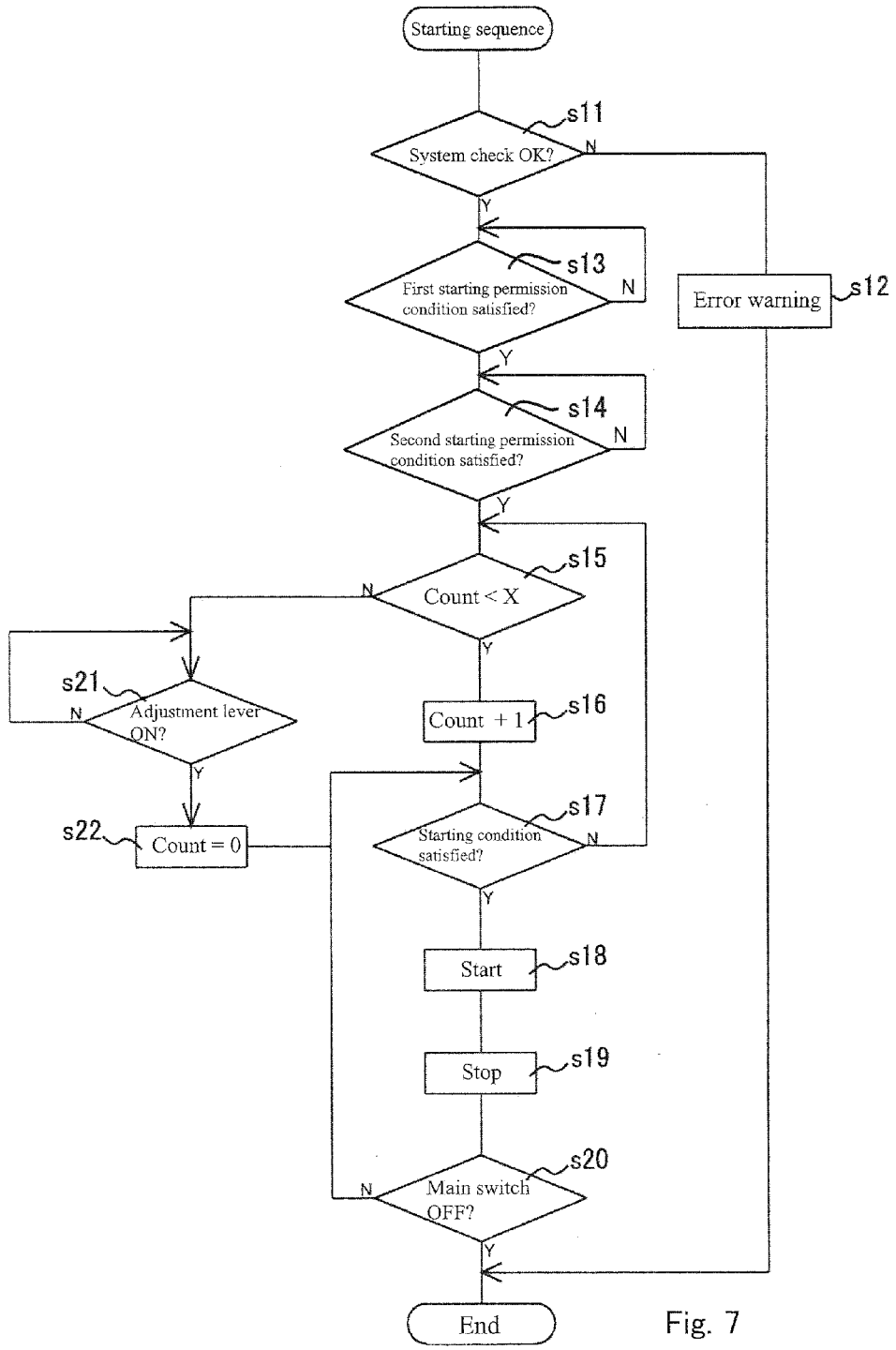
FIG. 7 is a flowchart showing a procedure of a starting process of the electric motorcycle of FIG. 1.

As described above, the controller 16 adjusts an acceleration amount of the rear wheel 3 using the operation member different from the accelerator grip 5a during the operation of the accelerator grip 5a, and adjusts the electric power generated in the electric motor 18 during the non-operation of the accelerator grip 5a. The electric motorcycle 1 which is capable of adjusting the output torque and the regenerative braking force by using the adjustment lever 27, is configured not to activate the electric motor 18 and not to start the electric motorcycle 1 unless a starting sequence which is a predetermined starting order is satisfied. Hereinafter, the starting sequence will be described with reference to FIG. 7.

When the driver turns ON the main switch 29, the controller 16 initiates the starting process, and the process goes to step s11. In step s11 which is a system error check step, the controller 16 checks whether or not errors have occurred in the sections in the controller 16, the electronic components connected to the sections etc. If it is determined that some errors have occurred in the electronic components, etc., the process goes to step s12. In step s12 which is an error warning step, the controller 16 displays information indicating that the errors have occurred, on the measurement instrument (not shown) such as a meter, to present a warning to the driver, and finishes the starting process step. On the other hand, if the determiner section 23 determines that there are no errors in the system, the process goes to step s13.

In step s13 which is a first condition satisfaction determination step, the determiner section 23 determines whether or not a first starting permission condition is satisfied. The first starting permission condition is such that the brake lever 25 which is a first operation member has been operated, i.e., the brake lever 25 has been pulled toward the driver. The determiner section 23 repeats the determination until the first starting permission condition is satisfied based on a result of detection from the brake sensor 26. If the determiner section 23 determines that the first starting permission condition is satisfied, the process goes to step s14.

In step s14 which is a second condition satisfaction determination step, the determiner section 23 determines whether or not a second starting permission condition is satisfied. The second starting permission condition is such that the adjustment 27 which is a second operation member different from the first operation member has been operated and pulled to the cut-off position. The determiner section 23 repeats the determination until the second starting permission condition is satisfied based on the adjustment command from the position sensor 28. If the determiner section 23 determines that the second starting permission condition is satisfied and a starting condition as will be described later is satisfied, the electric motorcycle 1 is placed in a starting stand-by-state in which the electric motorcycle 1 can be started, and the process goes to step s15.

In step s15 which is a count determination step, the determiner section 23 determines whether or not a count added in step s16 (described later) exceeds a predetermined value X. If the determiner section 23 determines that the count is equal to or less than the predetermined value X, the process goes to step s16. In step s16 which is a count adding step, the determiner section 23 adds 1 to a count. The count is a value stored in the determiner section 23 and indicates a duration of a stand-by state as will be described later. The count is added with one by one at every predetermined time. After the determiner section 23 adds 1 to the count, the process goes to step s17.

In step s17 which is a starting condition satisfaction determination step, the determiner section 23 determines whether or not the starting condition is satisfied. The starting condition is such that the adjustment lever 27 is placed in a non-cut-off operation state and the accelerator grip 5a has been operated. In other words, the starting condition is such that the adjustment lever 27 is not in the cut-off position and the accelerator grip 5a has been rotated from the grip reference position toward the driver. The determiner section 23 determines whether or not the starting condition is satisfied based on a result of detection from the position sensor 28 and the acceleration command from the accelerator grip sensor 24. If the determiner section 23 determines that the starting condition is satisfied, the process goes to step s18.

In step s18 which is a starting step, the inverter driving section 22 drives the inverter device 21, and supplies to the electric motor 18 the electric power corresponding to the acceleration command from the accelerator grip sensor 24 and the adjustment command from the position sensor 28. Thereby, the electric motor 18 is activated to drive the rear wheel 3, and the electric motorcycle 1 starts. After the electric motorcycle 1 starts in this way, the process goes to step s19. When the electric motorcycle 1 stops, the process goes to step s20.

In step s20 which is a main switch determination step, the determiner section 23 determines whether or not the main switch 29 has been turned OFF. When the main switch 29 has been turned OFF, and a command for causing the electric power supply to the major electronic components of the electric motorcycle 1 to be finished, is provided to the controller 16, the determiner section 23 determines that the main switch 29 has been turned OFF and finishes the starting process. On the other hand, if the determiner section 23 determines that the main switch 29 has not been turned OFF, the process goes to step s17.

As described above, in the electric motorcycle 1, the driver can recognize that the electric motorcycle 1 cannot be started even when the accelerator grip 5a is operated in the state in which the adjustment lever 27 has been moved to the cut-off position. On the other hand, the driver recognizes that the electric vehicle is in a state in which it can be started now when the accelerator grip 5a is operated after the adjustment lever 27 has been returned to the adjustment lever reference position. Thus, the driver can recognize that the electric motorcycle 1 can be started by a method other than visual check. Therefore, the driver need not visually check the measurement instrument, etc., at starting of the electric motorcycle 1, which improves convenience.

If the determiner section 23 determines that the starting condition is not satisfied in step s17, the process returns to step s15. If the determiner section 23 determines that the count is not less than the predetermined value X in step s15, the process goes to step s21. In step s21 which is a stand-by state determination step, the determiner section 23 determines whether or not to continue the starting stand-by state based on the position of the adjustment lever 27. The determiner section 23 detects the position of the adjustment lever 27 based on the adjustment command from the position sensor 28. If the determiner section 23 determines that the adjustment lever 27 is placed in a position other than the cut-off position, the determiner section 23 repeats the determination until it determines that the adjustment lever 27 is placed in the cut-off position.

If the determiner section 23 determines that the adjustment lever 27 is placed in the cut-off position, it determines that the starting stand-by state should not be continued, and the process goes to step s22. In step s22 which is a count reset step, the determiner section 23 resets the count to zero. After the resetting, the process goes to step s17.

As should be appreciated from above, in the starting stand-by state, when the adjustment lever 27 is operated at least one or more times before the count reaches X after the first and second starting permission conditions are satisfied, the starting stand-by state is maintained. When the starting condition is satisfied in the state in which the starting stand-by state is maintained, the electric motorcycle 1 can be started. The starting stand-by state can be continued by a simple operation which is the operation of the adjustment lever 27. The driver can recognize that the starting stand-by state is continued by such a simple operation. In addition, since the starting stand-by state is continued, the electric motorcycle 1 can be started immediately without satisfying the first and second starting permission conditions again. Thus, the operation for starting the electric motorcycle 1 is simple.

By moving the adjustment lever 27 to the cut-off position once after the count has reached X and the starting stand-by state has been finished, the electric motorcycle 1 can be started. Because of this, the electric motorcycle 1 can be started by the simple operation after the starting stand-by state has been finished, which improves convenience. Since the operation member used to input commands for causing the starting stand-by state to be finished and continued is the adjustment lever 27, the driver's intention to cause the electric motorcycle 1 to be kept in a stopped state or to start the electric motorcycle 1 is clearly shown as compared to a case where the operation member is the brake lever 25. In addition, the activated state of the electric motorcycle 1 can be adapted to the driver's intention.

Through step s13 and step s14, the electric motorcycle 1 can be started. After the starting, the torque and the regenerative braking force applied to the rear wheel 3 can be adjusted as described above by operating the accelerator grip 5a and the adjustment lever 27. For example, a case where the adjustment lever 27 is returned to the adjustment lever reference position, then the accelerator grip 5a is operated, and then the starting condition is satisfied, will be described. In this case, the controller 16 supplies the electric power corresponding to the acceleration command from the accelerator grip sensor 24 to the electric motor 18, to increase the output torque.

Although in the present embodiment, the first starting permission condition is such that the brake lever 25 has been operated, the present invention is not limited to this, but the first starting permission condition may be such that the driver is seated on the seat 14. The state in which the driver is seated on the seat 14 can be detected by providing, for example, a seat sensor which transmits information indicating that the driver is seated on the seat 14 to the controller 16, upon the driver being seated on the seat 14. Although in step s14, the second starting permission condition is such that the adjustment lever 27 has been operated, the present invention is not limited to this. For example, the second starting permission condition may be such that the foot brake lever 31 has been operated (the foot brake lever 31 is depressed from the foot brake reference position), or a button switch (not shown) has been operated. For example, the button switch is provided at the right grip 5a side of the handle and is constituted by a press button, a rocker switch, etc. After it is determined that the main switch 29 has not been turned OFF in step s20, the determiner section 23 may determine again whether or not the main switch 29 has been operated without returning to step s17.

Figure 9A:
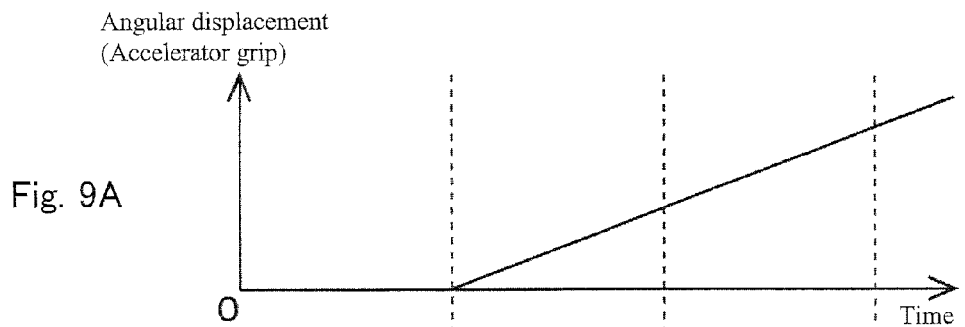
FIG. 9A-B are graphs showing an example of a change in the operation amount of the accelerator grip, a change in the operation amount of the adjustment lever, and a change in the torque, which changes occur with time, in the electric motorcycle of FIG. 1.
Figure 9B:
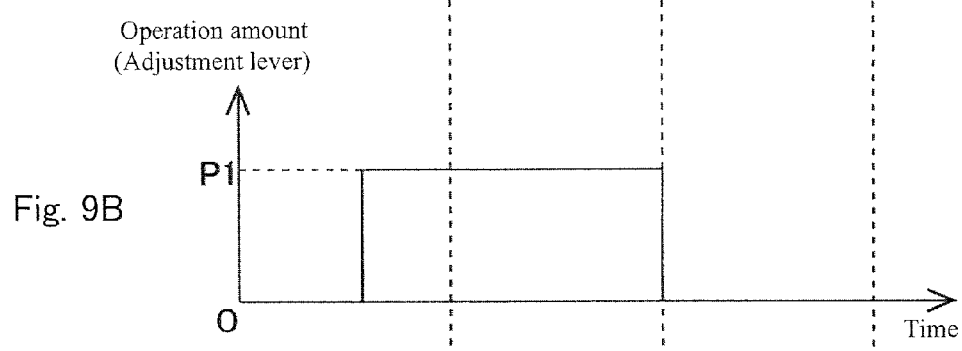
Figure 9C:
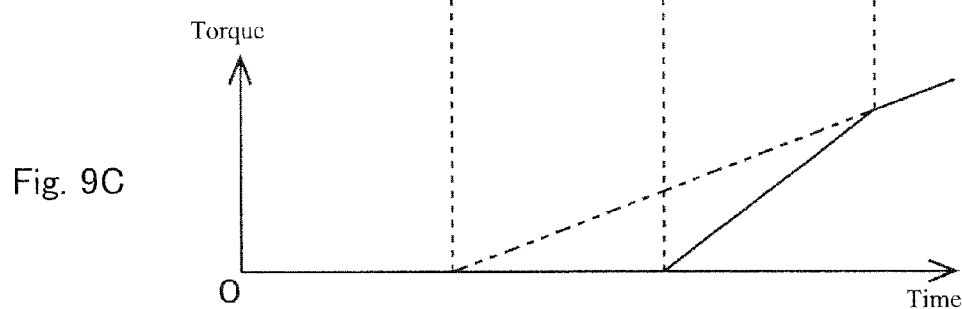

Next, a case where the electric motorcycle 1 is started in a state in which the accelerator grip 5a has been operated will be described with reference to FIGS. 8A-C and 9A-C. FIGS. 8A-C and 9A-C each graphically represent a change in the output torque of the electric motor 18 in response to the operation of the accelerator grip 5a and the operation of the adjustment lever 27. FIG. 8A and FIG. 9A each graphically represent a change in the operation amount of the accelerator grip 5a which occurs with time (vertical axis indicates the operation time and horizontal axis indicates time). FIG. 8B and FIG. 9B each graphically show a change in the operation amount of the adjustment lever 27 (vertical axis indicates operation amount and horizontal axis indicates time). FIGS. 8C and 9C each graphically show a change in the output torque of the electric motor 18 which occurs with time in a case where the above operations are performed (vertical axis indicates output torque and the horizontal axis indicates time).

As shown in FIGS. 8A and 8B, in a case where the adjustment lever 27 is gradually returned from the cut-off position to the adjustment lever reference position, in a state in which the accelerator grip 5a has been operated, the controller 16 increases the electric power supplied to the electric motor 18 according to an amount of the operation for returning the adjustment lever 27 to the adjustment lever reference position. Thus, the torque generated in the electric motor 18 increases according to the operation amount of the adjustment lever 27 (FIG. 8C). At a time point when the adjustment lever 27 has been returned to the adjustment lever reference position, prescribed electric power corresponding to the acceleration command from the accelerator grip sensor 24 is supplied to the electric motor 18, which generates the output torque corresponding to the operation amount of the accelerator grip 5a.

On the other hand, as shown in FIGS. 9A and 9B, in a case where the adjustment lever 27 is rapidly returned from the cut-off position to the adjustment lever reference position, in a state in which the accelerator grip 5a has been operated, the controller 16 increases the electric power supplied to the electric motor 18 according to the acceleration command. In this case, in order to return the electric power supplied to the electric motor 18 to the prescribed electric power corresponding to the operation amount of the accelerator grip 5a, the controller 16 slowly increases the electric power supplied to the electric motor 18 by gradually increasing the rate with which the electric power supplied to the electric motor 18 is increased, without rapidly increasing the electric power with a rate corresponding to the operation amount of the adjustment lever 27 (see FIG. 9C). This makes it possible to prevent the electric motorcycle 1 from being accelerated abruptly just after the starting condition is satisfied. By comparison, an increasing rate of the electric power supplied to the electric motor 18 is higher than a change rate of the acceleration command of the accelerator grip 5a. When the electric power supplied to the electric motor 18 reaches the prescribed electric power, it is increased or decreased thereafter according to the operation amount of the accelerator grip 5a and the operation amount of the adjustment lever 27.

In another case, the front wheel 2 can be braked by operating the brake lever 25 in a state in which the adjustment lever 27 has been returned from the cut-off position to the adjustment lever reference position, and the accelerator grip 5a has been operated. In this case, the electric power corresponding to the operation amount of the accelerator grip 5a is supplied to the electric motor 18, and torque of the electric motor 18 corresponding to the electric power supply is applied to the rear wheel 3. Thereby, by returning the brake lever 25, the electric motorcycle 1 can be accelerated rapidly.

In a case where the adjustment lever 27 is moved toward the cut-off position and then quickly returned toward the adjustment lever reference position in the middle of driving, the controller 16 supplies to the electric motor 18 electric power which is equal to or greater than the prescribed electric power corresponding to the operation amount of the accelerator grip 5a. The operation in this case will be described with reference to FIG. 10A-C. FIG. 10A shows a change in the accelerator grip 5a which occurs with time, and FIG. 10B shows a change in the operation amount of the adjustment lever 27 which occurs with time. FIG. 10C shows a change in the output torque of the electric motor 18 which occurs with time in a case where the above operations are performed. In FIGS. 10A to 10C, the vertical axes indicate the operation amount, the operation amount and the output torque, and the horizontal axis indicates time.

As shown in FIGS. 10A and 10B, in the middle of acceleration performed by operating the accelerator grip 5a, the adjustment lever 27 is operated to decrease the output torque (time t11). Then, the adjustment lever 27 is returned from that operation position (time t12) to which the adjustment lever 27 has been operated, to the adjustment lever reference position (time t13). In this case, if an operation amount ΔStroke per unit time is equal to or less than the predetermined value x (ΔStroke≤x), i.e., a time (t13–t12) which passes until the adjustment lever 27 is returned from the operation position to the adjustment lever reference position is equal to or less than a predetermined time (e.g., 0.1 second to 1 second), the controller 16 supplies to the electric motor 18 instantaneous electric power (e.g., electric power which is twice or three times as much as the electric power corresponding to the operation amount of the accelerator grip 5*a*) which is greater than the electric power corresponding to the operation amount of the accelerator grip 5*a* for a predetermined time after the adjustment lever 27 is returned to the adjustment lever reference position. Thus, the torque of the rear wheel 3 is increased rapidly to prevent reduction of the torque which is caused by operating the adjustment lever 27. This can be used in a case where torque with a great magnitude is necessary for a moment after the output torque is reduced, for example, in a case where the electric motorcycle 1 is riding up on a sloping road. Note that a value of the operation amount becomes zero when the adjustment lever 27 is placed in the adjustment lever reference position, and its positive value increases by pulling the adjustment lever 27 toward the driver. Although in the present embodiment, the instantaneous electric power is provided according to the operation amount ΔStroke per unit time, it may be provided when the time (t13–t12) which passes until the adjustment lever 27 is returned from the operation position to the adjustment lever reference position is equal to or less than the predetermined time.

Embodiment 2

An electric motorcycle 1A according to Embodiment 2 of the present invention is similar in configuration to the electric motorcycle 1 of Embodiment 1. Hereinafter, regarding the electric motorcycle 1A of Embodiment 2, differences from the electric motorcycle 1 of Embodiment 1 will be described. The same applies to an electric motorcycle 1B of Embodiment 3 and an electric motorcycle 1C of Embodiment 4.

Figure 11:
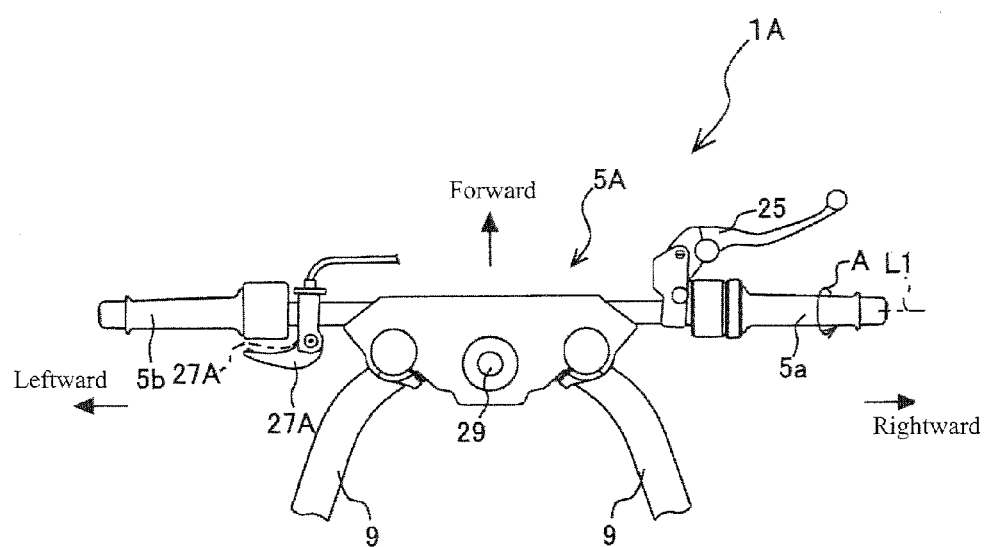
FIG. 11 is an enlarged plan view showing a region near a handle of an electric motorcycle according to Embodiment 2 of the present embodiment.

As shown in FIG. 11, the electric motorcycle 1A includes a handle 5A extending linearly in the rightward and leftward direction. The handle 5A is provided with an adjustment lever 27A in a location closer to the driver than the left grip 5*a*. The driver's left hand thumb can contact the adjustment lever 27A. The adjustment lever 27A can be pushed forward with the thumb to be pivoted forward (see two-dotted line in FIG. 11) relative to the adjustment lever reference position (see solid line in FIG. 11). The adjustment lever 27A is applied with a biasing force for returning the adjustment lever 27A to the adjustment lever reference position. When the driver takes off the thumb from the adjustment lever 27A after the driver has pushed the adjustment lever 27A, the adjustment lever 27A returns to the adjustment lever reference position. The adjustment lever 27A configured as described above has a function similar to that of the adjustment lever 27 of Embodiment 1 except for its location and operation direction. A controller 16A is configured to adjust an acceleration amount and a regenerative braking force steplessly according to the position with respect to the adjustment lever reference position.

The electric motorcycle 1A of Embodiment 2 has advantages as those of the electric motorcycle 1 of Embodiment 1.

Embodiment 3

In the electric motorcycle 1B of Embodiment 3, the inverter driving section 22 in a controller 16B controls driving of the inverter device 21 to increase the electric power generated in the electric motor 18 when the operation amount of the adjustment lever 27 is increased in a state in which the accelerator grip 5*a* is placed in the grip reference position (see FIG. 1). The electric power generated in the electric motor 18 can be adjusted steplessly in a range of 0% to 100% by moving the adjustment lever 27 from the adjustment lever reference position (cut-off position) in which the generated electric power is 0% to a predetermined position in which the generated electric power is 100%.

On the other hand, the inverter driving section 22 in the controller 16B controls driving of the inverter device 21 to increase the electric power supplied to the electric motor 18 when the operation amount of the adjustment lever 27 is increased in a state in which the accelerator grip 5*a* has been operated (see FIG. 1). The electric power supplied to the electric motor 18 can be adjusted steplessly in a range of 0% to 100% by moving the adjustment lever 27 from the adjustment lever reference position (cut-off position) in which the supplied electric power is 0% to a predetermined position in which the supplied electric power is 100%.

Thus, by moving the adjustment lever 27 toward the driver like the accelerator grip 5*a*, the acceleration amount can be adjusted. Thus, its operation is easy. Although the electric motorcycle 1B of Embodiment 3 is configured in such a manner that the supplied electric power and the generated electric power become 0% when the adjustment lever 27 is placed in the adjustment lever reference position and become 100% when the adjustment lever 27 is placed in the predetermined position, the configuration may be different. For example, the supplied electric power may be 0% and the generated electric power may be 100% when the adjustment lever 27 is placed in the adjustment lever reference position, and the supplied electric power may be 100% and the generated electric power may be 0% when the adjustment lever 27 is placed in the predetermined position, or vice versa.

The electric motorcycle 1B of Embodiment 3 has advantages as those of the electric motorcycle 1 of Embodiment 1.

Embodiment 4

Figure 12:
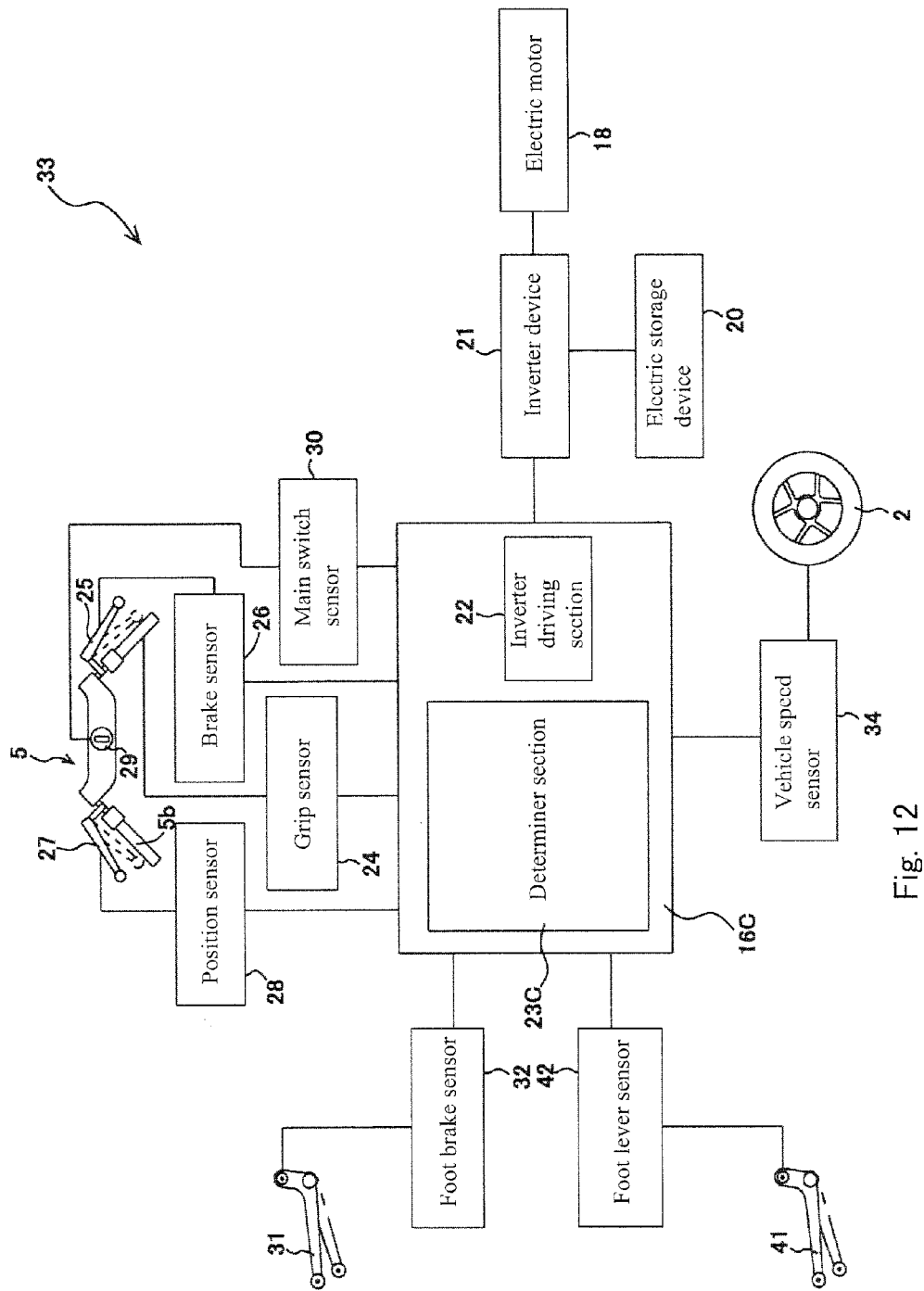
FIG. 12 is a block diagram showing an electric configuration of a control system in an electric motorcycle according to Embodiment 4 of the present invention.

As shown in FIG. 12, the electric motorcycle 1C of Embodiment 4 is provided with a foot lever 41. The foot lever 41 is provided at a left side (i.e., at an opposite side of the foot brake lever 31) of a lower end portion of the pivot frame 10. The foot lever 41 allows a pastern of a left foot to be put thereon, and a toe of the left foot to be put on its tip end portion. The foot lever 41 is pivotable downward from a foot lever reference position by depressing the tip end portion of the foot lever 41 with the toe. The foot lever 41 is applied with a biasing force for returning the foot lever 41 to the foot lever reference position. When the toe is taken off from the tip end portion of the foot lever 41, the foot lever 41 returns to the foot brake reference position. In addition, the foot lever 41 is provided with a foot sensor 42. The foot sensor 42 is a switching sensor and is configured to detect whether or not the foot lever 41 has been operated. The foot sensor 42 is coupled to the controller 16C and provides a result of detection to the controller 16C.

A determiner section 23C of the controller 16C is configured to determine that the second starting permission condition is satisfied when the foot lever 41 has been operated in step s14 which is the starting process and the foot sensor 42 provides information indicating detection of the operation. By operating the foot lever 41 in this way, the starting sequence ends.

Alternatively, the foot lever 41 may be used as an activated state switch member. That is, when the foot lever 41 is operated, the controller 16C does not activate the electric motor 18 irrespective of the operation of the accelerator grip 5*a*, while in a non-operated state in which the foot lever 41 is returned to the foot lever reference position, the controller 16C supplies to the electric motor 18 electric power corresponding to the operation amount of the accelerator grip 5a to activate the electric motor 18. When the foot lever 41 is in the non-operated state and the accelerator grip 5a has been operated in step s17, a determiner section 23C in the controller 16C determines that the starting condition is satisfied.

As described above, the operation member capable of switching the activated state may be provided in addition to the adjustment lever 27, the accelerator grip 5a and the brake lever 25. Instead of the foot lever 41, a similar operation member may be used so long as the operation member is positioned to enable the driver to operate it.

Although in Embodiment 4, the foot lever 41 is provided, a press button such as the activated state switch button may be provided. This button is configured to be turned ON/OFF. When the button is turned OFF, the electric motorcycle 1 is switched to the activated state in which the electric power is supplied to the electric motor 18 and the electric power is generated in the electric motor 18. On the other hand, when the button is turned ON, the electric motorcycle 1 is switched to the cut-off state in which the electric power is inhibited from being supplied to the electric motor 18 and the electric power is not generated in the electric motor 18. As in Embodiment 4, when this button is turned ON, the controller 16C determines that the second starting permission condition is satisfied.

Other Embodiment

Although in Embodiment 1 to Embodiment 4, the adjustment levers 27 and 27A are provided on the left grip 5a and the brake lever 25 is provided on the right grip 5b, the positional relationship may be reversed. Although in Embodiment 1 to Embodiment 4, the adjustment levers 27 and 27A and the foot lever 41 serve as the activated state switch members, the brake lever 25 and the foot brake lever 31 may be the activated state switch members as well. In this case, for example, when the adjustment lever 27 is moved to the cut-off position and the brake lever 25 is operated, the controller 16 stops supplying of the electric power to the electric motor 18, while when at least one of the two operation members 27 and 25 is in the non-operated state, the controller 16 permits the electric power to be supplied to the electric motor 18. Thus, the operation of the two operation members allows the driver to recognize more obviously that the electric motor 18 is deactivated than the operation of one operation member.

Although in the electric motorcycles 1 and 1A to 1C of Embodiment 1 to Embodiment 4, both of the torque adjustment process and the regenerative braking force adjustment process are executed by operating the adjustment lever 27, either one of the processes may be executed. Specifically, the following embodiments may be adopted. When the adjustment lever 27 is operated in the state in which the accelerator grip 5a has been operated, the torque adjustment process is executed, while even when the adjustment lever 27 is operated in the state in which the accelerator grip 5a has been operated, the regenerative braking force adjustment process is not executed. Or, even when the adjustment lever 27 is operated in the state in which the accelerator grip 5a has been operated, the torque adjustment process is not executed, while when the adjustment lever 27 is operated in the state in which the accelerator grip 5a has been operated, the regenerative braking force adjustment process is executed. The adjustment lever 27 may only serve as the activated state switch member and may not serve as the torque adjustment member and the regenerative braking force adjustment member.

The electric motorcycles 1 and 1A to 1C need not go through the above stated starting sequence, but may go through a simpler starting sequence, for example, a starting sequence in which the electric motorcycle 1 can be started when either one of the first and second starting permission conditions is satisfied.

Although the amount of electric power supplied to the electric motor and the regeneration amount are adjusted individually according to a situation, as acceleration/deceleration adjustment during driving, torque control for reducing the braking force may be executed when the operation amount of the lever is small, regeneration control for increasing the braking force may be executed when the operation amount of the lever is great, or cut-off control may be executed in a boundary between the regeneration control and the torque control. In this case, when the lever is operated, the command input by the throttle grip may be nullified, and acceleration/deceleration control may be executed preferentially in response to the command input by the lever.

Although the amount of electric power supplied to the electric motor and the regeneration amount are adjusted individually according to the state (operation amount of the accelerator grip 5a), as the acceleration/deceleration adjustment during driving, an acceleration command corresponding to the operation amount of the accelerator grip 5a may be nullified, the torque adjustment process which produces smaller deceleration effect may be executed when the operation amount of the adjustment lever 27 is smaller than a predetermined operation amount, and the regenerative braking force adjustment process which produces greater deceleration effect may be executed when the operation amount of the adjustment lever 27 is greater than the predetermined operation amount. In this case, preferably, cut-off control is executed in a boundary between the torque adjustment process and the regenerative braking force adjustment process.

Although in the electric motorcycles 1 and 1A to 1C of Embodiment 1 to Embodiment 4, the rear wheel 3 is driven by one electric motor 18, a plurality of electric motors 18 may be coupled together by a gear mechanism, etc., to drive the rear wheel 3. In this case, the inverter driving section 22 controls the inverter device 21 such that the number of electric motors 18 which are activated and generate electric power is changed according to the operation amount of the adjustment lever 27. Thus, the torque and the generated electric power can be adjusted stepwisely.

Although the electric motor 18 is the three-phase AC motor, it may be a DC motor. In this case, a voltage/current controller is provided instead of the inverter device 21. The voltage/current controller is able to control a current and voltage supplied to the electric motor 18 and hence adjust the output torque and revolutions of the electric motor 18.

In the electric motorcycles 1 and 1A to 1C of Embodiment 1 to Embodiment 4, after it is determined that the second starting permission condition is satisfied in step s14, the controller 16 may display this information on a measurement instrument such as the meter device which can be visually checked by the driver. Or, the controller 16 may display the rate with which the electric motorcycle 1 is accelerated/decelerated according to the operation amount of the adjustment lever 27 or 27A on a measurement instrument such as the meter device which can be visually checked by the driver.

Although in Embodiment 1 to Embodiment 4, the control system 33 is applied to the electric motorcycles 1 and 1A to 1C, it may be applied to an electric four-wheeled vehicle, an electric three-wheeled vehicle, etc., so long it is a vehicle in which the drive wheel is driven by the electric motor 18.

Especially, the control system 33 is suitably employed in vehicles having handles gripped by the driver's hands.

REFERENCE CHARACTERS LIST 1 electric motorcycle
3 rear wheel
5 handle
5a accelerator grip (right grip)
5b left grip
16 controller
18 electric motor
20 electric storage device
21 inverter device
22 inverter driving section
23 determiner section
25 brake lever
27 adjustment lever
31 foot brake lever
33 control system
41 foot lever

The invention claimed is:

1. An acceleration control system in an electric vehicle comprising:
   an electric motor for driving a drive wheel by electric power supplied to the electric motor;
   a controller for supplying the electric power to the electric motor;
   an acceleration operation member operated by a driver to input to the controller a command for causing the drive wheel to be accelerated; and
   an acceleration amount adjustment member provided separately from the acceleration operation member and operated by the driver to input to the controller a command for adjusting an acceleration amount of the drive wheel;
   wherein the controller controls an amount of the electric power supplied to the electric motor in response to the command for causing the drive wheel to be accelerated, which is received as an input from the acceleration operation member and the command for adjusting the acceleration amount of the drive wheel, which is received as an input from the acceleration amount adjustment member.

2. The acceleration control system in the electric vehicle according to claim 1,
   wherein the controller generates the electric power supplied to the electric motor in response to an operation of the acceleration operation member, and suppresses the electric power supplied to the electric motor in response to an operation of the acceleration amount adjustment member.

3. An acceleration control system in an electric vehicle, comprising:
   an electric motor for driving a drive wheel by electric power supplied to the electric motor;
   an acceleration operation member for inputting a command for causing the drive wheel to be accelerated;
   a controller for supplying the electric power to the electric motor in response to the command from the acceleration operation member; and
   an acceleration amount adjustment member provided separately from the acceleration operation member;
   wherein the acceleration operation member is movable in a first predetermined direction from a predetermined first reference position and is applied with a biasing force in a direction opposite to the first predetermined direction to return the acceleration operation member to the first reference position;
   wherein the acceleration amount adjustment member is movable in a second predetermined direction from a predetermined second reference position and is applied with a biasing force in a direction opposite to the second predetermined direction to return the acceleration amount adjustment member to the second reference position; and
   wherein the controller increases the electric power supplied to the electric motor as an operation amount of the acceleration operation member with respect to the first reference position increases and decreases the electric power supplied to the electric motor as the acceleration operation member moves closer to the first reference position when the acceleration operation member returns to the first reference position; and
   wherein the controller decreases the electric power supplied to the electric motor as an operation amount of the acceleration amount adjustment member with respect to the second reference position increases and increases the electric power supplied to the electric motor as the acceleration amount adjustment member moves closer to the second reference position when the acceleration amount adjustment member returns to the second reference position.

4. The acceleration control system in the electric vehicle according to claim 3,
   wherein the controller nullifies the operation of the acceleration operation member and halts electric power supply to the electric motor, when the acceleration amount adjustment member is moved by a predetermined operation amount or greater in the second predetermined direction from the second reference position.

5. The acceleration control system in the electric vehicle according to claim 3, comprising:
   a steering device including two gripping members which are gripped by a driver's right and left hands, respectively;
   wherein the acceleration operation member is provided at one of the gripping members; and
   wherein the acceleration amount adjustment member is provided at the other gripping member.

6. The acceleration control system in the electric vehicle according to claim 5,
   wherein the acceleration operation member is an operation member of a throttle grip shape which is attached on the one of the gripping members such that the acceleration operation member is operated to be rotatable in the first predetermined direction around an axis of the acceleration operation member; and
   wherein the acceleration amount adjustment member is an operation member of a lever shape which is operated to be movable in the second predetermined direction.

7. The acceleration control system in the electric vehicle according to claim 4,
   wherein the controller supplies to the electric motor prescribed electric power corresponding to the operation amount of the acceleration operation member;
   wherein when the acceleration amount adjustment member is moved by the predetermined operation amount or more and the acceleration operation member is operated, before starting of the electric vehicle, and then the acceleration amount adjustment member is returned by a predetermined operation amount or more to activate and start the electric motor, the controller gradually increases the electric power supplied to the electric motor to the prescribed electric power.

8. The acceleration control system in the electric vehicle according to claim 3,
wherein when a predetermined torque increasing condition is satisfied after the acceleration amount adjustment member has been moved in the second predetermined direction, the controller supplies to the electric motor instantaneous electric power which is greater than prescribed electric power corresponding to an operation amount of the acceleration operation member at a time point when the predetermined torque increasing condition is satisfied.

9. An acceleration control system in an electric vehicle comprising:
an electric motor for driving a drive wheel by electric power supplied to the electric motor;
a steering device including two gripping members which are gripped by a driver's right and left hands, respectively;
an acceleration operation member which is a grip operation member attached to one of the two gripping members;
an acceleration operation member sensor which detects an operation amount of the acceleration operation member and outputs an acceleration command corresponding to the detected operation amount of the acceleration operation member;
an acceleration amount adjustment member which is a lever operation member attached to the other of the two gripping members;
an acceleration amount adjustment member sensor which detects an operation amount of the acceleration amount adjustment member and outputs an adjustment command corresponding to the detected operation amount of the acceleration amount adjustment member; and
a controller which adjusts the electric power supplied to the electric motor in response to the acceleration command received from the acceleration operation member sensor and the adjustment command received from the acceleration amount adjustment member sensor.

10. The acceleration control system in the electric vehicle according to claim 1, comprising:
a steering device including two gripping members which are gripped by a driver's right and left hands, respectively;
wherein the acceleration operation member is attached to one of the two gripping members; and
wherein the acceleration amount adjustment member is attached to the other of the two gripping members.

11. The acceleration control system in the electric vehicle according to claim 10,
wherein the acceleration operation member steplessly or stepwisely outputs the command for causing the drive wheel to be accelerated, according to the operation amount of the acceleration operation member;
wherein the acceleration amount adjustment member steplessly or stepwisely outputs the command for adjusting the acceleration amount of the drive wheel, according to the operation amount of the acceleration amount adjustment member; and
wherein the controller supplies to the electric motor the electric power corresponding to the command for causing the drive wheel to be accelerated, when the acceleration operation member is operated, and decreases the supplied electric power at a rate corresponding to the command for adjusting the acceleration amount of the drive wheel, when the acceleration amount adjustment member is operated.

12. The acceleration control system in the electric vehicle according to claim 1,
wherein the acceleration operation member steplessly or stepwisely outputs the command for causing the drive wheel to be accelerated, according to the operation amount of the acceleration operation member;
wherein the acceleration amount adjustment member steplessly or stepwisely outputs the command for adjusting the acceleration amount of the drive wheel according to the operation amount adjustment member; and
wherein the controller supplies to the electric motor the electric power corresponding to the command for causing the drive wheel to be accelerated, and decreases the supplied electric power at a rate corresponding to the command for adjusting the acceleration amount of the drive wheel.

13. The acceleration control system in the electric vehicle according to claim 1, comprising:
a steering device including two gripping members which are gripped by a driver's right and left hands, respectively; and
a brake operation member for activating a brake mechanism for mechanically braking the drive wheel;
wherein the brake operation member is attached to one of the two gripping members, and the acceleration amount adjustment member is attached to the other of the two gripping members.

14. The acceleration control system in the electric vehicle according to claim 1,
wherein the controller changes a change amount of the electric power supplied to the electric motor, corresponding to a unit operation amount of the acceleration amount adjustment member, based on a driving state or a change in the adjustment command which occurs with time.

15. The acceleration control system in the electric vehicle according to claim 1,
wherein when the controller determines that the acceleration amount adjustment member has been operated with a predetermined operation amount or more, based on the adjustment command, the controller causes the electric vehicle to start.

* * * * *